(12) United States Patent
Wolf et al.

(10) Patent No.: US 11,776,398 B2
(45) Date of Patent: Oct. 3, 2023

(54) APPARATUS, SYSTEM AND METHOD FOR MERGING AND APPLYING INTERSECTION DATA FOR A VEHICLE

(71) Applicants: VOLKSWAGEN AKTIENGESELLSCHAFT, Wolfsburg (DE); AUDI AG, Ingolstadt (DE)

(72) Inventors: Joerg Christian Wolf, Foster City, CA (US); Michael Zweck, Gaimersheim (DE); Christian Steen, Nuremberg (DE); Dmitriy Kuzikov, Beijing (CN)

(73) Assignees: VOLKSWAGEN AKTIENGESELLSCHAFT, Wolfsburg (DE); AUDI AG, Ingolstadt (DE)

( * ) Notice: Subject to any disclaimer, the term of this patent is extended or adjusted under 35 U.S.C. 154(b) by 455 days.

(21) Appl. No.: 17/035,001

(22) Filed: Sep. 28, 2020

(65) Prior Publication Data
US 2022/0101728 A1    Mar. 31, 2022

(51) Int. Cl.
G08G 1/0967    (2006.01)
G08G 1/0968    (2006.01)
H04W 4/021     (2018.01)
H04W 4/44      (2018.01)

(52) U.S. Cl.
CPC . *G08G 1/096783* (2013.01); *G08G 1/096733* (2013.01); *G08G 1/096844* (2013.01); *H04W 4/021* (2013.01); *H04W 4/44* (2018.02)

(58) Field of Classification Search
CPC ....... G08G 1/096783; G08G 1/096733; G08G 1/096844; H04W 4/021; H04W 4/44
See application file for complete search history.

(56) References Cited

U.S. PATENT DOCUMENTS

| | | | |
|---|---|---|---|
| 10,140,862 B2 | 11/2018 | Ova et al. | |
| 10,607,480 B2 | 3/2020 | Israelsson | |
| 2018/0075740 A1* | 3/2018 | Radomy | G08G 1/07 |
| 2020/0004268 A1* | 1/2020 | Park | B60W 30/18154 |
| 2020/0310450 A1* | 10/2020 | Reschka | B60W 60/0011 |

* cited by examiner

*Primary Examiner* — Benyam Haile
(74) *Attorney, Agent, or Firm* — Peter Zura; LOZA & LOZA, LLP

(57) ABSTRACT

Technologies and techniques for merging/resolving MAP data and signal phase and timing (SPaT) messages for traffic light data prediction a vehicle in an intelligent transportation system. SPaT data and/or MAP data may be received in a vehicle from a direct source and a network source, and processed to merge data from the two different platforms. The merging of the data allows a vehicle to generate inferences relating to traffic light data received on direct, low-latency, connections, while taking advantage of the more comprehensive data provided from the network source.

23 Claims, 14 Drawing Sheets

APPARATUS, SYSTEM AND METHOD FOR MERGING AND APPLYING INTERSECTION DATA FOR A VEHICLE

TECHNICAL FIELD

The present disclosure relates to vehicle-to-infrastructure (V2I) communications processing. More specifically, the present disclosure is directed to merging and applying intersection data in a V2I environment for a vehicle to improve mapping and traffic light data management.

BACKGROUND

Vehicle-to-infrastructure (V2I) is a communication model that allows vehicles to share information with the components that support a country's highway system. Such components include overhead wireless (e.g., RFID) readers and cameras, traffic lights, lane markers, streetlights, signage and parking meters. V2I communication is typically wireless and bi-directional: data from infrastructure components can be delivered to the vehicle over an ad hoc network and vice versa. Similar to vehicle-to-vehicle (V2V) communication, V2I uses dedicated short-range communication (DSRC), C-V2X PC5 or C-V2X NR communication mode to transfer data. All modes support messages in the SAE J2735 format.

In an intelligent transportation system (ITS), V2I sensors can capture infrastructure data and provide travelers with real-time advisories about such things as road conditions, traffic congestion, accidents, construction zones and parking availability. Likewise, traffic management supervision systems can use infrastructure and vehicle data to set variable speed limits and adjust traffic signal phase and timing (SPaT) to increase fuel economy and traffic flow. The hardware, software and firmware that makes communication between vehicles and roadway infrastructure is an important part of all driver and/or driverless car initiatives.

During use, V2I signals may be transmitted across different data channels having varying levels of signal quality. For SPaT signaling, various fields are designated as optional fields, and may not contain data that may be needed for specific applications. Moreover, different mapping formats may be used by different content providers, which may introduce inefficiencies and/or inaccuracies in vehicle systems when utilizing V2I technology.

SUMMARY

Various apparatus, systems and methods are disclosed herein relating to controlling operation of a vehicle. In some illustrative embodiments, a method is disclosed for merging MAP data for a signal phase and timing (SPaT) message in a vehicle, comprising receiving first MAP data from a network source; receiving second MAP data from a direct source that is different from the network source; processing the first MAP data to determine first lane data and a first maneuver data associated with the first lane data; processing the second MAP data to determine second lane data and a second maneuver data associated with the second lane data; comparing the first lane data with the second lane data to determine a substantial match; comparing the first maneuver data with the second maneuver data to determine an exact match; and generating a traffic light signal group mapping for at least one of the first lane data and/or the second lane data.

In some illustrative embodiments, a method is disclosed for merging signal phase and timing (SPaT) messages in a vehicle, comprising receiving a first SPaT message from a network source, the first SPaT message comprising a field comprising first data estimating a traffic signal phase change timing; receiving a second SPaT message from a direct source, the second SPaT message comprising a minimum timing range field and a maximum timing range field for the traffic signal phase change; processing the first and the second SPaT messages to determine the timing position of the first data estimating a traffic signal phase change timing relative to the minimum timing range field and the maximum timing range field; and generating a merged SPaT message comprising second data estimating the traffic signal phase change timing based on the processing of the first and the second SPaT messages.

In some illustrative embodiments, a system is disclosed for merging MAP data for a signal phase and timing (SPaT) message in a vehicle, comprising a first communications circuit for communicating with a network source; a second communications circuit for communicating with a direct source; and a MAP compare and select circuit, operatively coupled to the first and second communications circuits, wherein the MAP compare and select circuit is configured to receive first MAP data from the first communications circuit; receiving second MAP data from the second communications circuit; process the first MAP data to determine first lane data and a first maneuver data associated with the first lane data; process the second MAP data to determine second lane data and a second maneuver data associated with the second lane data; compare the first lane data with the second lane data to determine a substantial match; compare the first maneuver data with the second maneuver data to determine an exact match; and generate a traffic light signal group mapping for at least one of the first lane data and/or the second lane data.

In some illustrative embodiments, a system is disclosed for merging signal phase and timing (SPaT) messages in a vehicle, comprising: a first communications circuit for communicating with a network source; a second communications circuit for communicating with a direct source; and a SPaT merge circuit, operatively coupled to the first and second communications circuits, wherein the SPaT merge circuit is configured to receive a first SPaT message from a network source, the first SPaT message comprising a field comprising first data estimating a traffic signal phase change timing; receive a second SPaT message from a direct source, the second SPaT message comprising a minimum timing range field and a maximum timing range field for the traffic signal phase change; process the first and the second SPaT messages to determine the timing position of the first data estimating a traffic signal phase change timing relative to the minimum timing range field and the maximum timing range field; and generate a merged SPaT message comprising second data estimating the traffic signal phase change timing based on the processing of the first and the second SPaT messages.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE FIGURES

The present invention is illustrated by way of example and not limitation in the figures of the accompanying drawings, in which like references indicate similar elements and in which.

DETAILED DESCRIPTION

Figure 1:
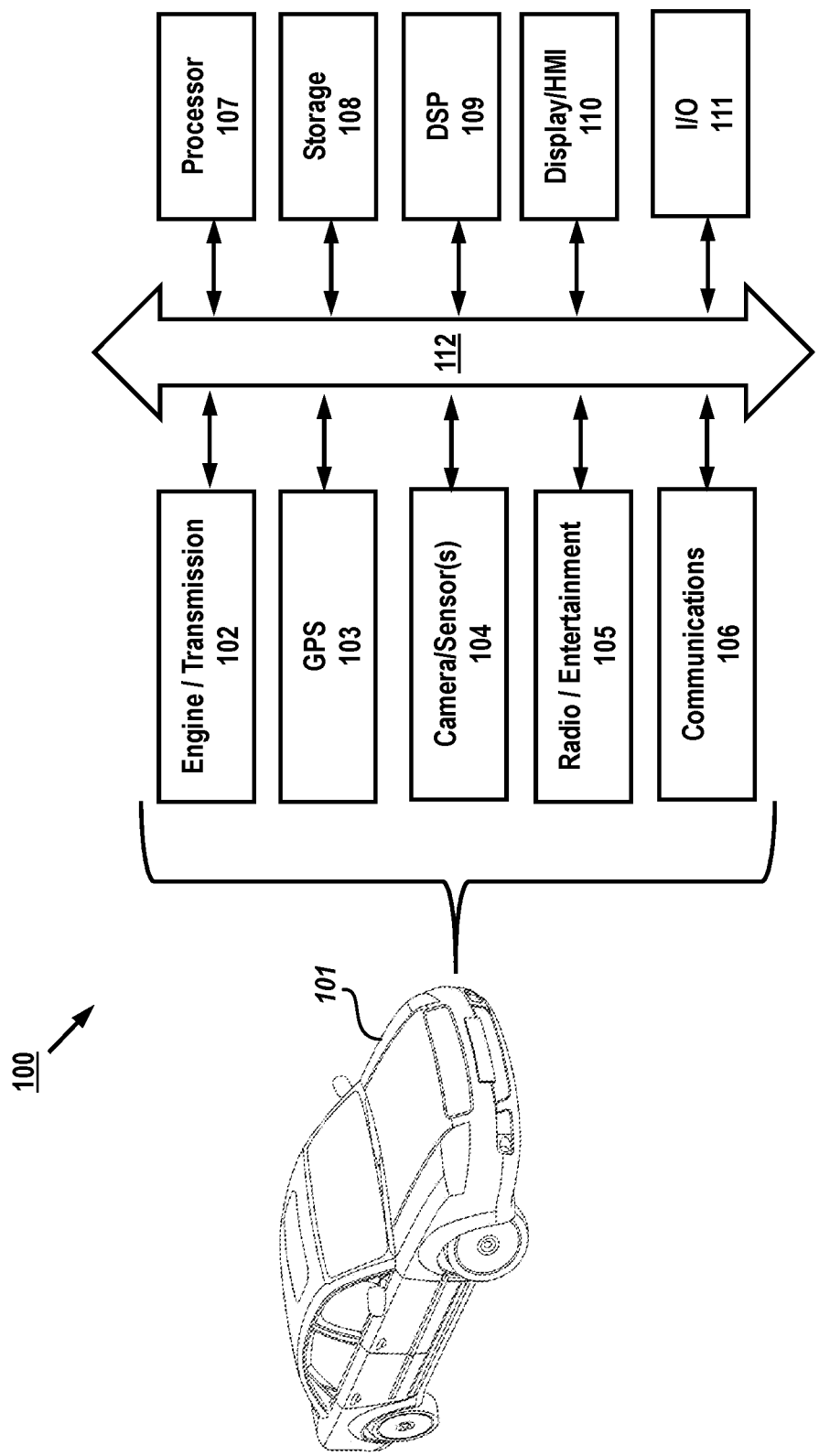
FIG. 1 shows an exemplary vehicle system block diagram showing multiple components and modules, together with a navigation system according to some aspects of the present disclosure.

The figures and descriptions provided herein may have been simplified to illustrate aspects that are relevant for a clear understanding of the herein described devices, structures, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. However, because such elements and operations are known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Exemplary embodiments are provided throughout so that this disclosure is sufficiently thorough and fully conveys the scope of the disclosed embodiments to those who are skilled in the art. Numerous specific details are set forth, such as examples of specific components, devices, and methods, to provide this thorough understanding of embodiments of the present disclosure. Nevertheless, it will be apparent to those skilled in the art that specific disclosed details need not be employed, and that exemplary embodiments may be embodied in different forms. As such, the exemplary embodiments should not be construed to limit the scope of the disclosure. In some exemplary embodiments, well-known processes, well-known device structures, and well-known technologies may not be described in detail.

The terminology used herein is for the purpose of describing particular exemplary embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

The disclosed embodiments may be implemented, in some cases, in hardware, firmware, software, or any tangibly-embodied combination thereof. The disclosed embodiments may also be implemented as instructions carried by or stored on one or more non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

It will be understood that the term "module" as used herein does not limit the functionality to particular physical modules, but may include any number of tangibly-embodied software and/or hardware components. In general, a computer program product in accordance with one embodiment comprises a tangible computer usable medium (e.g., standard RAM, an optical disc, a USB drive, or the like) having computer-readable program code embodied therein, wherein the computer-readable program code is adapted to be executed by a processor (working in connection with an operating system) to implement one or more functions and methods as described below. In this regard, the program code may be implemented in any desired language, and may be implemented as machine code, assembly code, byte code, interpretable source code or the like (e.g., via Scalable Language ("Scala"), C, C++, C#, Java, Actionscript, Objective-C, Javascript, CSS, XML, etc.).

Turning to FIG. 1, the drawing illustrates an exemplary system 100 for a vehicle 101 comprising various vehicle electronics circuitries, subsystems and/or components. Engine/transmission circuitry 102 is configured to process and provide vehicle engine and transmission characteristic or parameter data, and may comprise an engine control unit (ECU), and a transmission control. For a diesel engine, circuitry 102 may provide data relating to fuel injection rate, emission control, NOx control, regeneration of oxidation catalytic converter, turbocharger control, cooling system control, and throttle control, among others. For a gasoline and/or hybrid engine, circuitry 102 may provide data relating to lambda control, on-board diagnostics, cooling system control, ignition system control, lubrication system control, fuel injection rate control, throttle control, and others. Transmission characteristic data may comprise information relating to the transmission system and the shifting of the gears, torque, and use of the clutch. Under one embodiment, an engine control unit and transmission control may exchange messages, sensor signals and control signals for any of gasoline, hybrid and/or electrical engines.

Global positioning system (GPS) circuitry 103 provides navigation processing and location data for the vehicle 101. The camera/sensors 104 provide image or video data (with our without sound), and sensor data which may comprise data relating to vehicle characteristic and/or parameter data (e.g., from 102), and may also provide environmental data pertaining to the vehicle, its interior and/or surroundings, such as temperature, humidity and the like, and may further include LiDAR, radar, image processing, and computer vision. Radio/entertainment circuitry 105 may provide data relating to audio/video media being played in vehicle 101. The radio/entertainment circuitry 105 may be integrated and/or communicatively coupled to an entertainment unit configured to play AM/FM radio, satellite radio, compact disks, DVDs, digital media, streaming media and the like. Communications circuitry 106 allows any of the circuitries of system 100 to communicate with each other and/or external devices (e.g., devices 202-203) via a wired connection (e.g., Controller Area Network (CAN bus), local interconnect network, etc.) or wireless protocol, such as 3G, 4G, 5G, Wi-Fi, Bluetooth, Dedicated Short Range Communications (DSRC), cellular vehicle-to-everything (C-V2X) PC5 or NR, and/or any other suitable wireless protocol. While communications circuitry 106 is shown as a single circuit, it should be understood by a person of ordinary skill in the art that communications circuitry 106 may be configured as a plurality of circuits. In one embodiment, circuitries 102-106 may be communicatively coupled to bus 112 for certain communication and data exchange purposes.

Vehicle 101 may further comprise a main processor 107 (also referred to herein as a "processing apparatus") that centrally processes and controls data communication throughout the system 100. The processor 107 may be configured as a single processor, multiple processors, or part of a processor system. In some illustrative embodiments, the processor 107 is equipped with advanced driver assistance circuitries and infotainment circuitries that allow for communication with and control of any of the circuitries in vehicle 100. Storage 108 may be configured to store data, software, media, files and the like, and may include map data, SPaT data and other associated data, discussed in greater detail below. Digital signal processor (DSP) 109 may comprise a processor separate from main processor 107, or may be integrated within processor 107. Generally speaking, DSP 109 may be configured to take signals, such as voice, audio, video, temperature, pressure, position, etc. that have been digitized and then process them as needed. Display 110 may consist of multiple physical displays (e.g. virtual cluster instruments, infotainment or climate control displays). Display 110 may be configured to provide visual (as well as audio) indicial from any circuitry in FIG. 1, and may be a configured as a human-machine interface (HMI), LCD, LED, OLED, or any other suitable display. The display 110 may also be configured with audio speakers for providing audio output. Input/output circuitry 111 is configured to provide data input and outputs to/from other peripheral devices, such as cell phones, key fobs, device controllers and the like. As discussed above, circuitries 102-111 may be communicatively coupled to data bus 112 for transmitting/receiving data and information from other circuitries.

In some examples, the vehicle 101 may be part of a V2I system that includes traffic signal controllers configured to communicate traffic signal timings. Many existing traffic signal controllers already run software that supports communication protocols, such as the National Transportation Communications for ITS Protocol (NTCIP) and California's Assembly Bill 3418 (AB3418) protocol, designed, among others, to communicate signal phase and loop detector information to traffic management centers. Typically, the acquiring of signal phase and timing can be done using phase count-down and broadcast software. Real-time data polling may be configured to run at predetermined intervals (e.g., every second) to query for data, such as a current signal timing plan, cycle second, phase call or detection call, and the like, at a minimum from a signal controller (e.g., 208) directly, or tied with a signal management system at a traffic management system (e.g., 204). Specified interfaces may be configured between the signal phase acquisition, the phase countdown and the broadcast in order to isolate changes required in different installations. In conventional systems the phase countdown are sometimes operated as an emulation of the internal logic of the traffic signal controller in order to duplicate the countdown from the traffic signal controller.

To effect phase countdown, configuration or transfer files may be structured to contain, for example, a timing plan, the interval lengths assigned to each phase, and whether the system is fixed or actuated and/or coordinated and the correspondence between each approach, defined by geographical information and used as the basic information element in the broadcast message, and the internal traffic signal phase that controls that approach. The geographical information specified in this file may become part of the broadcast message and is used by an in-vehicle application to determine which signal phase and timing information is relevant. Interface standards such as SAE J2735 (DSRC Technical Committee) or CAMP protocols may be used to enable these functions.

For SPaT communication, a SPaT message may be configured as a plurality of messages, a single message, or combination thereof. Signal Phase and Timing (SPaT) messaging may describe the signal state of an intersection and how long this state will persist for each approach and lane that is active. A SPaT message may send the current state of each phase, and movements are given to specific lanes and approaches by use of the lane numbers present in the message. Map Data (MAP) messaging may describe the static physical geometry of one or more intersections, such as lane geometries and the allowable vehicle movements for each lane, and may additionally include an intersection data frame that describes barriers, pedestrian walkways, shared roadways and rail lines that may affect vehicle movements. A MAP message may be configured as an object that includes complex intersection descriptions and can also describe curved approaches. The contents of this message are at times referred to as the Geometric Intersection Description (GID) layer, and may be configured to be static.

The overall use of the SPaT message is to reflect the current state of all lanes in all approaches in a single intersection. Any preemption or priority then follows in a structure for the whole intersection. Lanes that are at the same state (with the same end time) may be combined. Thus, as an example, the simplest SPaT message may have two such states, one for the then active lanes/approach, and another for all the other lanes that at that time share the state being stopped (a red state).

In the case of a traffic light controller, the controller may provide information about its current status (e.g., using National Transportation Communications for Intelligent Transportation System Protocol (NTCIP) to a module that creates a V2I message. This message includes a SPaT message, and may contain elements regarding the timing when the traffic light might change state (e.g. green to red). Some examples of such SPaT message fields are detailed below in Table 1:

TABLE 1

| Field | Description |
|---|---|
| startTime TimeMark | When the phase itself started or is expected to start. This in turn allows the indication that a set of time change details refers to a future phase, rather than a currently active phase. |
| minEndTime TimeMark | Used to convey the earliest time possible at which the phase could change |
| maxEndTime TimeMark | Used to convey the latest time possible at which the phase could change |
| likelyTime TimeMark | The most likely time the phase changes. This occurs between MinEndTime and MaxEndTime and is applicable for traffic-actuated control programs. |
| confidence TimeIntervalConfidence | Used to convey basic confidence data about the likelyTime. |
| nextTime TimeMark | Used to express a general value (rough estimate) regarding when this phase will next occur. This is intended to be used to alert on-board equipment when the next green/go may occur so that various ECO driving applications can better manage the vehicle during the intervening stopped time. |

Figure 2:
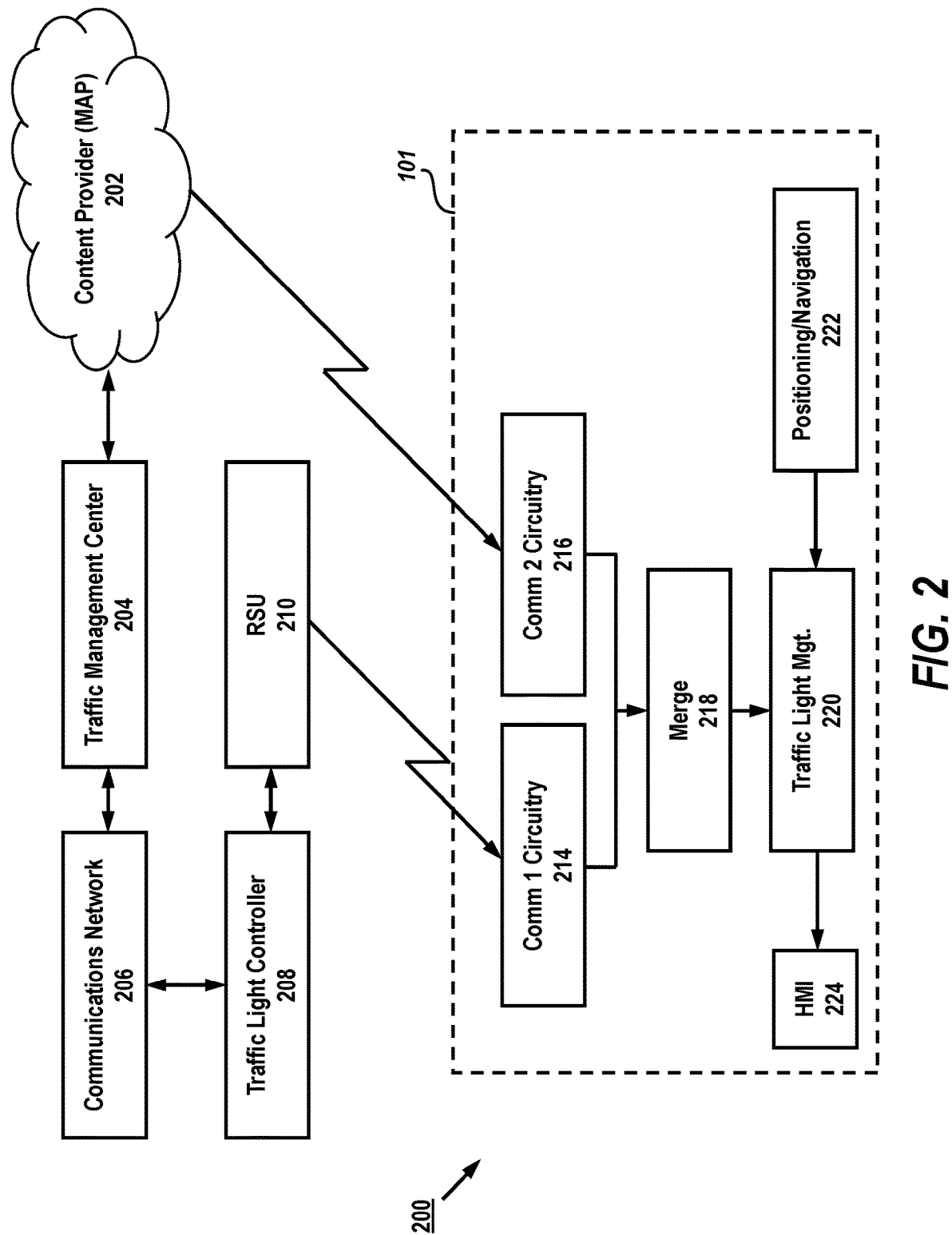
FIG. 2 shows a V2I system for a vehicle communicating with a content provider to receive SAE J2735 MAP and SPaT data, and also communicating with a road-side unit (RSU) to receive SPaT data, wherein the vehicle is configured to process and merge the received data according to some aspects of the present disclosure.

FIG. 2 shows a V2I system 200 for a vehicle 101 communicating with a content provider 202 to receive MAP and SPaT data, and also communicating with a road-side unit (RSU) 210 to receive MAP and SPaT data, wherein the vehicle 101 is configured to process and merge the received data according to some aspects of the present disclosure. During operation, a SPaT message may be communicated to a vehicle (e.g., 101) via different channels with different data quality. Additionally, since some of the SPaT message fields may be optional, those fields may be absent when the SPaT message is transmitted using a direct source (e.g., C-V2X, DSRC). In this case, the SPaT message may alternately be transmitted from other network-based sources that are subject to latency issues. For example, the likelyTime field in a SPaT message may be produced in a traffic light controller (e.g., 208) and transmitted to a road-side unit (RSU) (e.g., 210) and communicated to a vehicle (e.g., 101). However, if the likelyTime field is not provided by a traffic light controller, this signal may be produced from a network source such as a content provider (e.g., 202). Furthermore, traffic light controllers are typically configured to only provide information on the end of the current phase state, and not any future states. A content provider can extend the information provided by the traffic light controller, by providing a series of states (time horizon) for minEndTime, likelyTime and maxEndTime. However, such network sources may introduce latencies for the communicated likelyTime signal. Similar issues exist for other fields such as startTime, minEndTime and maxEndTime, among others.

In this example, a content provider 202 may be configured as a cloud-based service or other suitable network arrangement (e.g., server, distributed network, etc.), wherein the content provider 202 communicates with a traffic management center (TMC) 204 (also known as a "transportation management center") that is configured to monitors and/or control traffic and the road network. Content Provider 202 may also be configured to directly access the infrastructure network 206. The TMC 204 may be considered a center that manage a broad range of transportation facilities including freeway systems, rural and suburban highway systems, and urban and suburban traffic control systems. The TMC 204 may be configured to communicate over a communications network 206 to exchange data with intelligent transportation system (ITS) roadway equipment and connected vehicle roadside equipment (RSE) such as traffic light controller 208 and road-side unit (RSU) 210, to monitor and manage traffic light data, traffic flow data and monitor the condition of the roadway, surrounding environmental conditions, and/or field equipment status, depending on the RSE configuration.

The traffic light controller 208 may be configured as a fixed-cycle controller or as an adaptive or actuated controller that allows the traffic light controller 208 to adapt traffic signal phase cycles to existing road and/or traffic conditions. When configured as an adaptive or actuated controller the green time can be extended by a number of seconds when a vehicle passes an advanced detector. The end time for the green phase can be extended for passing vehicles until a configured maximum end time. The RSU 210 may be configured similarly to a wireless LAN access point, and can provide communications with vehicles (e.g., 101) as well as other infrastructure of system 200. As can be seen in the figure, data from the traffic light controller 208 may be communicated to RSU 210 and transmitted to the vehicle 101.

Vehicle 101 may be a similar vehicle to the described in FIG. 1 and includes first communications circuitry 214 and second communications circuitry 216, which may be part of communications circuitry 106. While two communications circuits 214, 216 are shown as being separate circuits, a person of ordinary skill in the art will recognize that the circuits may be integrated into a single circuit. In some examples, the first communications circuit 214 may be configured to operate using a broadcast or one-way communication link between the first communication circuit 214 and the RSU 210, where the communications circuit 214 receives data (e.g., SPaT, MAP) from the RSU. Examples of such communication include, but are not limited to, DSRC, wireless access in vehicular environment (WAVE), and one-way infrastructure-to-vehicle communications, C-V2X PC5 and NR In some examples, the first communications circuit 214 may be configured for WiMAX communications, utilizing Ad hoc On-Demand Distance Vector (AODV) routing for receiving data from the RSU 210.

The second communications circuit 216 may be configured to communicate via a wireless data network, such as a cellular network including, but not limited to, 3G, 4G and/or 5G LTE or other suitable network. The second communications circuit 216 may be configured to receive data (e.g., SPaT, MAP) from the content provider 202. During operation, data received in the first communications circuit 214 and second communications circuit 216 are transmitted to merge circuit 218, which is configured to merge the data and forward it to a traffic light management circuit 220 to process the data along with data from positioning navigation circuit 222 to determine a merged MAP configuration and merged SPaT timing estimation, discussed in greater detail below. The output from the traffic light management circuit 220 may be transmitted to a HMI 224 (see 110) for display and/or interaction for a driver. In some examples, merge circuit 218 and traffic light management circuit 220 may be configured to operate in conjunction with a processor (e.g., 107) and may be separate circuits or a single integrated circuit, depending on the application. In some example, the output of traffic light management circuit 220 may be transmitted to a controller associated with an autonomous and/or semi-autonomous driving system to control operation of a vehicle.

Figure 3:
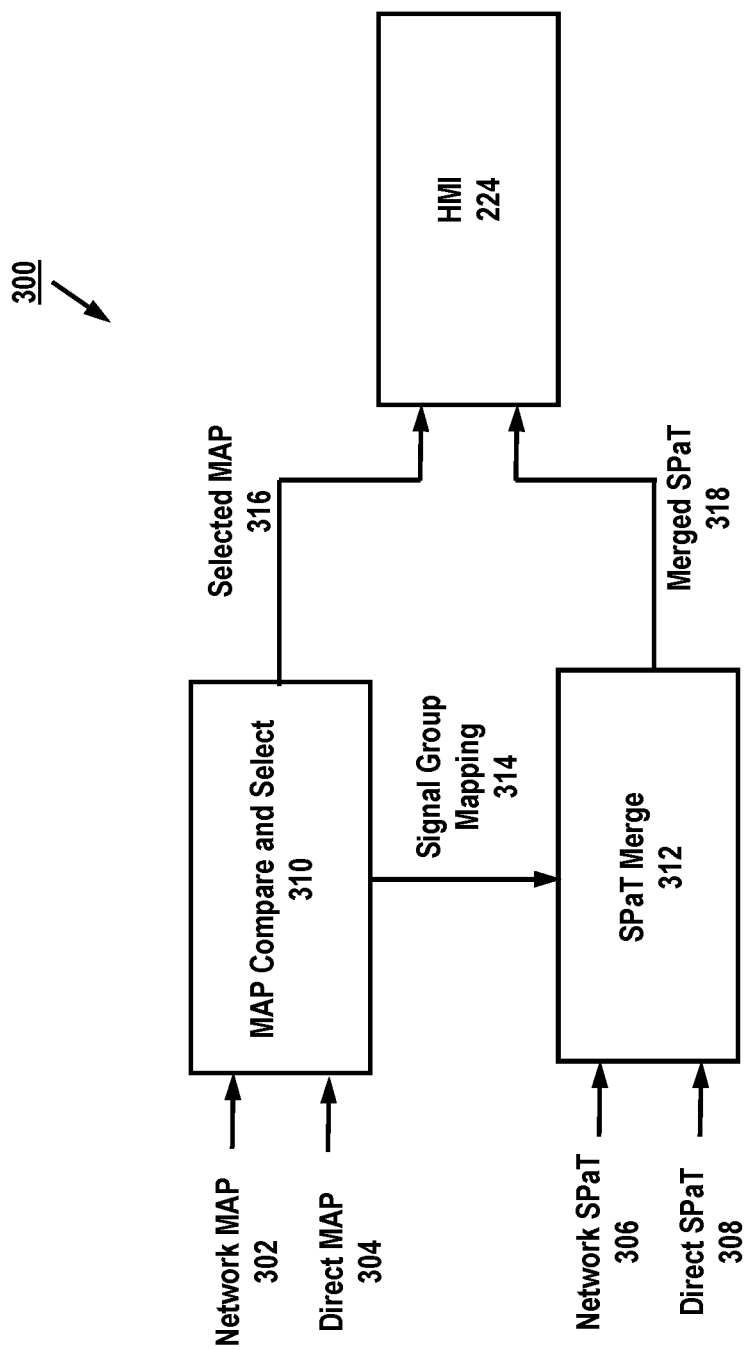
FIG. 3 shows a block diagram of circuitry for the vehicle of FIGS. 1 and 2 for performing MAP data processing and SPaT merge processing for transmission to a human-machine interface (HMI) according to some aspects of the present disclosure.

FIG. 3 shows a block diagram of circuitry 300 for the vehicle of FIGS. 1 and 2 for performing MAP data merge processing and SPaT merge processing for transmission to a human-machine interface (HMI) according to some aspects of the present disclosure. In this example, the MAP compare and select circuit 310 receives MAP data from a network MAP data source 302 (e.g., 202) and MAP data from a direct source 304 (e.g., RSU 210). Similarly, the SPaT merge circuit 312 receives SPaT data from a network SPaT data source (e.g., 202) and SPaT data from a direct source 308 (e.g., RSU 210). The MAP compare and select circuit 310 and SPaT merge circuit 312 may be incorporated into any of merge circuitry 218 and/or traffic light management circuitry 220 discussed in connection with FIG. 2. As used herein, a "direct source" refers to a n-V2N or non-UU communication platform that may broadcast signals to any receiving vehicles in a geographic area in the vicinity the broadcasting source (e.g., RSU 210).

As mentioned above, the network MAP data received in 302 and direct MAP data received in 304 may be from different sources and may have different formats. Accordingly, the MAP compare and select circuit 310 compares the MAP data from 302 and 304 to resolve map differences to select MAP data that includes signal group mapping, which is provided in 314 to SPaT merge circuit 312. The selected MAP data is then transmitted in 316 to HMI 224. Similar to the MAP data, the network SPaT data 306 and direct SPaT data 308 may contain different fields pertaining to a SPaT message. For example, the network SPaT data from 306 may include most or all of the optional fields for the SPaT messages, while the direct SPaT data from 308 may only have a few (or none) of the optional fields. In some examples, the SPaT merge circuit 312 may be configured to merge the data from SPaT messages 306 and 308, using signal group mapping data from 314 to provide merged SPaT messages that may be transmitted in 318 to the HMI 224. The HMI 224 may then use the selected MAP data from 316 and merged SPaT data from 318 to provide estimated SPaT data to a driver with regard to traffic signaling conditions and phases for a particular MAP area.

By utilizing both network-based and directly communicated data for MAP and/or SPaT data, a vehicle (e.g., 101) may effectively utilize real-time, low latency data provided from a direct source (e.g., RSU 210), and supplement the directly-received data using associated network source data (e.g., from content provider 202), that is able to provide larger or more comprehensive data sets, in order to provide more complete information regarding traffic light data.

Figure 4:
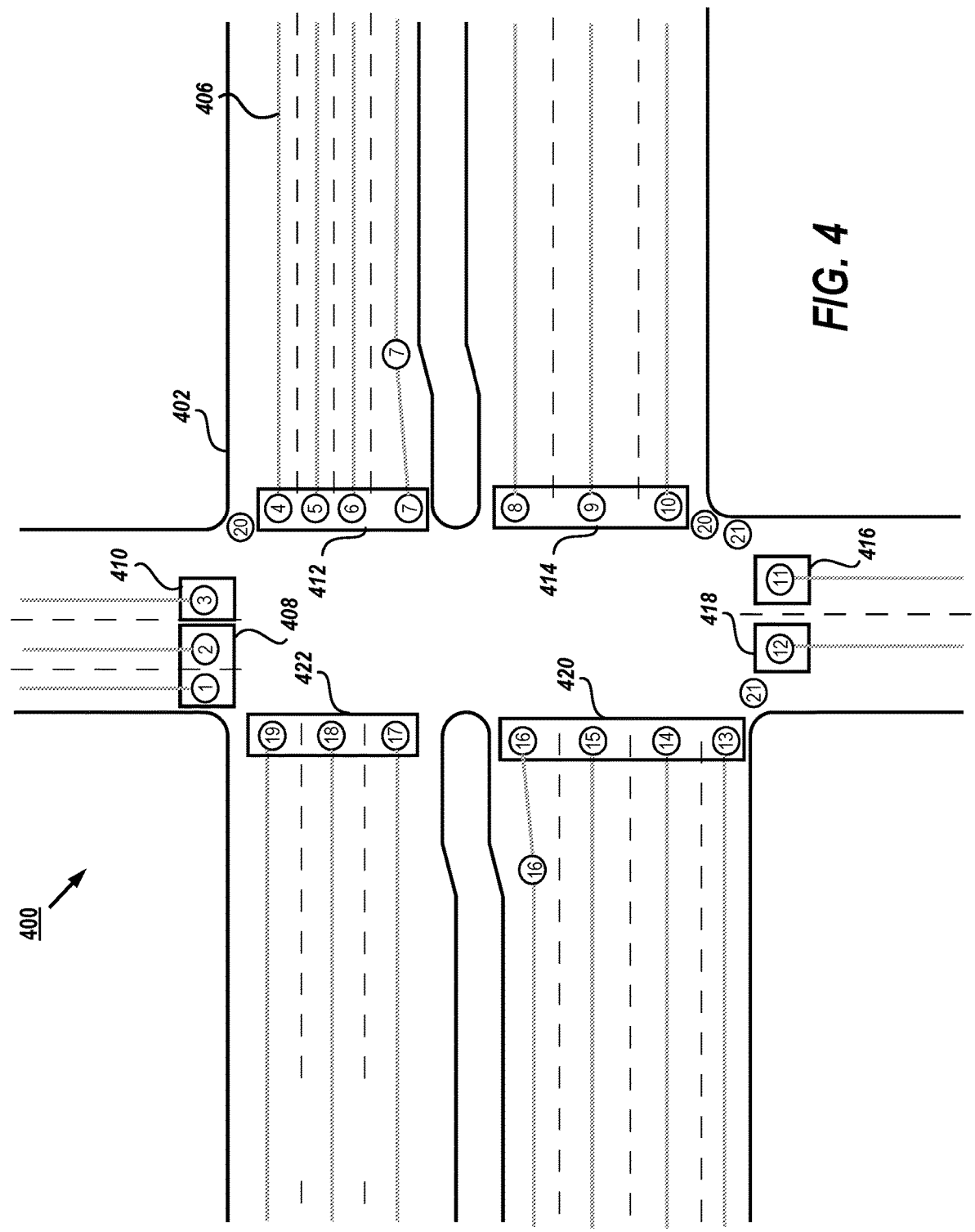
FIG. 4 shows an illustrative MAP topology for an intersection that includes lane identifications, lane movements, and signal groups according to some aspects of the present disclosure.

FIG. 4 shows an illustrative MAP topology 400 for an intersection 402 that includes lane identifications, lane movements, and signal groups according to some aspects of the present disclosure. In this example, simulated MAP data shows an intersection 402 having two roads positioned east-to-west, and a single road positioned north-to-south, intersecting them as shown in the figure. In some examples, road paths or lanes (e.g., 406) are marked and provided with a lane identification (ID) number, shown as circled numbers 1 through 21, and the traffic light signals may be arranged in signal groups 408-422, with associated movements (e.g., left/right turn, straight, etc.) for each group. This data, as well as additional and/or alternate data for MAP topology 400, may be generated and/or transmitted from content provider 202 and/or RSU 210

Figure 5:
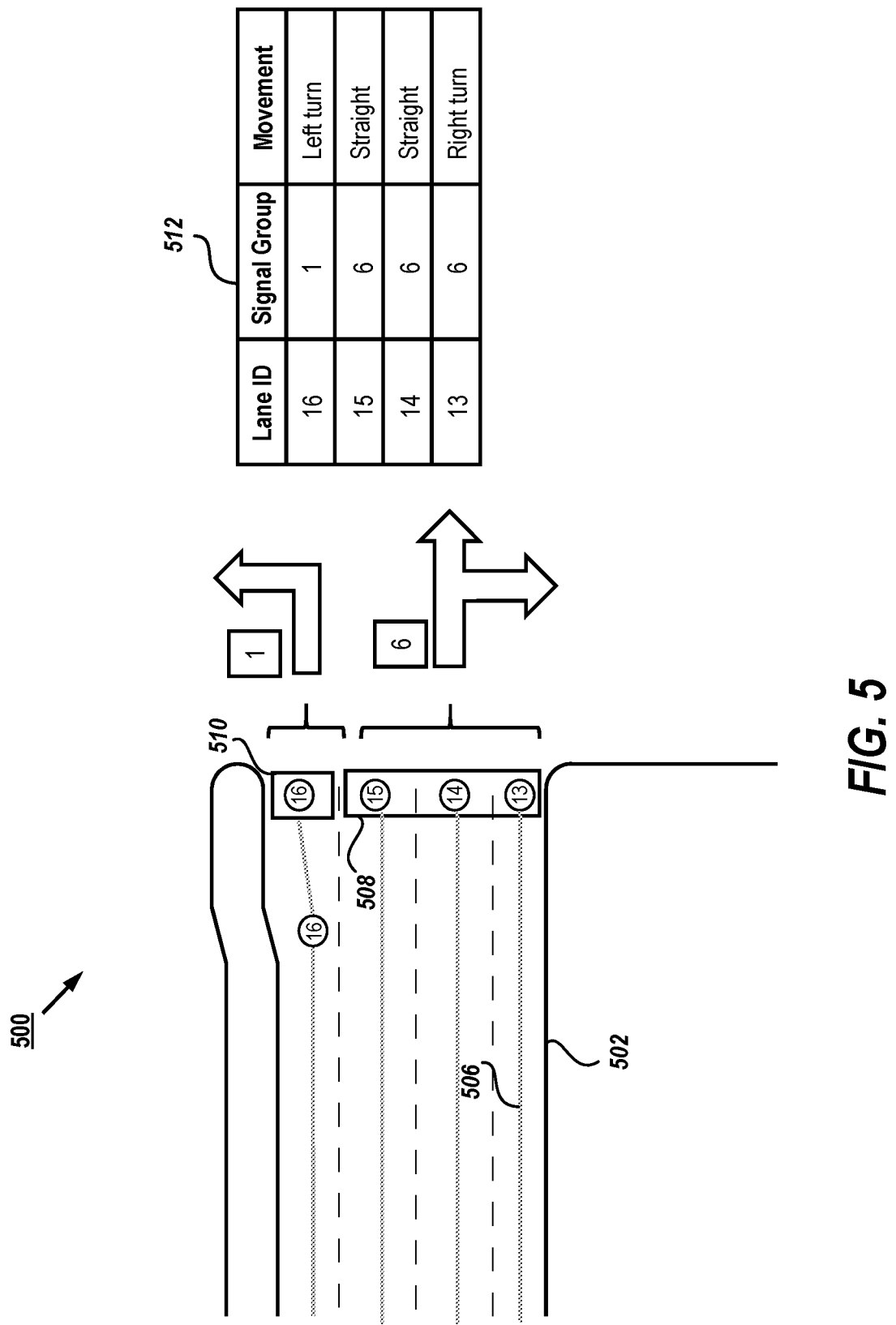
FIG. 5 shows a portion of the illustrative map topology of FIG. 4 for an intersection and shows more detailed designations of lane identifications, lane movements, and signal groups according to some aspects of the present disclosure.

FIG. 5 shows a portion 500 of the illustrative map topology of FIG. 4 for the intersection portion 502 and shows more detailed designations of lane identifications, lane movements, and signal groups according to some aspects of the present disclosure. Here, lane IDs 13-16 may correspond to lane IDs 13-16 discussed above in connection with FIG. 4. Each lane ID has a designated path 506, wherein lane ID 16 is designated as being part of signal group "1" (510), while lane IDs 13-15 are designated as being part of signal group "6" (508). It should be understood by a person having ordinary skill in the art that the lane ID and signal group numbers in the example are arbitrary, and that a multitude of different numbering schemas may be used, depending on the specific application. As can be seen in the accompanying table 512, lane ID 16, being part of signal group 1 (510), is designated as being authorized for a left turn movement. Lane IDs 13-15 are assigned to signal group 6 (508), where lane IDs 15 and 16 are authorized for straight movement and lane ID 13 is authorized for a right turn.

In some examples, the MAP message is configured to describe the intersection layout and includes the lane geometry of each lane and the corresponding (traffic light) signal group and movement (e.g., left/right turn, straight, etc.). During operation a vehicle (e.g., 101) may utilize geolocation (e.g., via GPS 103) to match the vehicle location with the MAP data and may determine the lane the vehicle is in and which traffic light corresponds to the lane. When merging MAP data from two different sources, signal groups should be mapped to ensure accuracy in the overall mapping. As an example, signal groups from different MAP sources may be assigned different numbers. To reconcile these and other differences, the MAP and compare circuit 310 may be configured to process the MAP data by comparing polylines and associated maneuvers in the MAP data to select an accurate MAP for the SPaT data.

Figure 6:
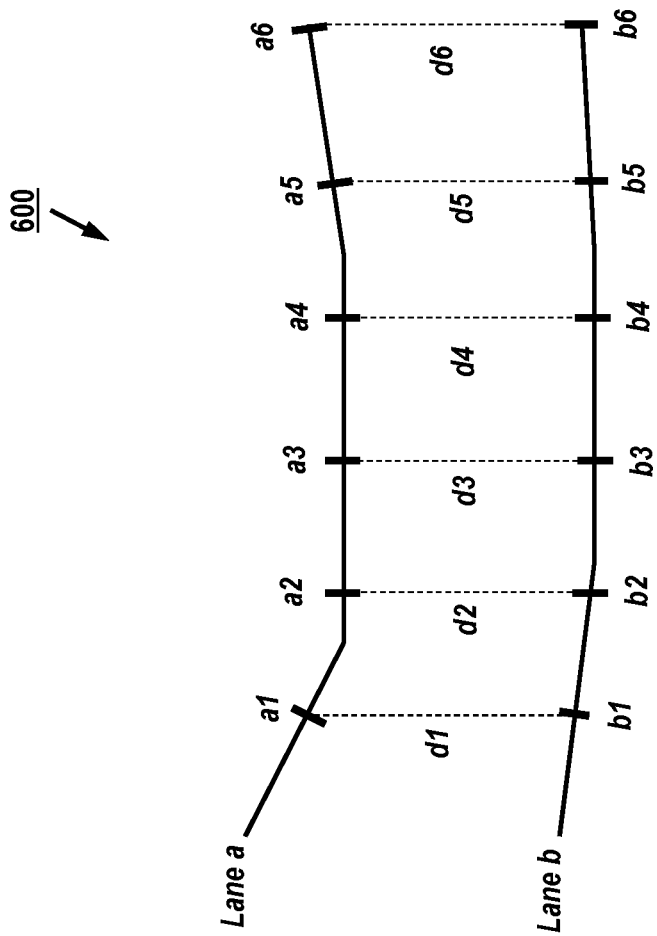
FIG. 6 shows a map segmentation diagram for a map compare algorithm configured to merge two maps from different MAP sources according to some aspects of the present disclosure.

FIG. 6 shows a MAP segmentation diagram 600 for a MAP compare algorithm configured to merge two maps from different MAP sources according to some aspects of the present disclosure. In this example, the map segmentation diagram 600 illustrates a result from a MAP compare and select circuit (310) receiving two MAPs—MAP A and MAP B—and processing all lanes in a MAP portion (e.g., intersection 402) to identify a lane that is towards the center of an intersection. During operation, the MAP compare and select circuit 310 processes all lanes a in MAP A and lanes b in MAP B. Lanes a and b are then further processed to determine if they are configured for the same direction (e.g., inbound). Next, the lanes are processed individually to determine which lane is shortest, within a configured bounded region (e.g., 200 m) (lengthtocompare=min(length (a), length(b), 200 m), and then divided into equally spaces sample points. In the example of FIG. 5, lane a is shown as being segmented into sample points a1-a6, and lane b is shown as being segmented into sample points b1-b6. Once each lane is segmented, a distance d is calculated between each sample point. In the example of FIG. 6, the distance between a1 and b1 is calculated as d1, the distance between a2 and b2 is calculated as d2, the distance between a3 and b3 is calculated as d3, and so on. Once all of the distances d1-d6 are calculated, they are summed to determine a distance score.

In some examples, this process may be repeated for all of the lanes of MAP A, and then the segmentation and distance processing may be performed on lanes of MAP B to determine the closest lanes corresponding to each processed lane in MAP A, resulting in a substantial match. In some examples, the substantial match may be determined by a threshold, such as a lane having the smallest distance score, or other suitable metric. For each of the closest lanes, a determination is made via the MAP compare and select circuit (310) to determine if the two lanes have the same maneuver assigned to them (e.g., both lanes are a left turn). If the maneuvers are the same, a mapping entry is generated indicating the correspondence. For example, it may be determined that lane a assigned to signal group x corresponds to lane b with signal group y. If the maneuver does not match (e.g., lane a is straight, and lane b is a left turn), the MAP compare and select circuit (310) may processed to the next closest lane to determine if the assigned maneuvers match. If the maneuvers are the same, a mapping entry is generated indicating the correspondence. If there is no match, the third closest lane may be processed, and so on. This process may repeat for the lanes until a threshold is reached (e.g., distance score limit). In some examples, the process may be repeated in reverse by comparing lanes of MAP B to lanes of MAP A to confirm mapping entries.

Figure 7:
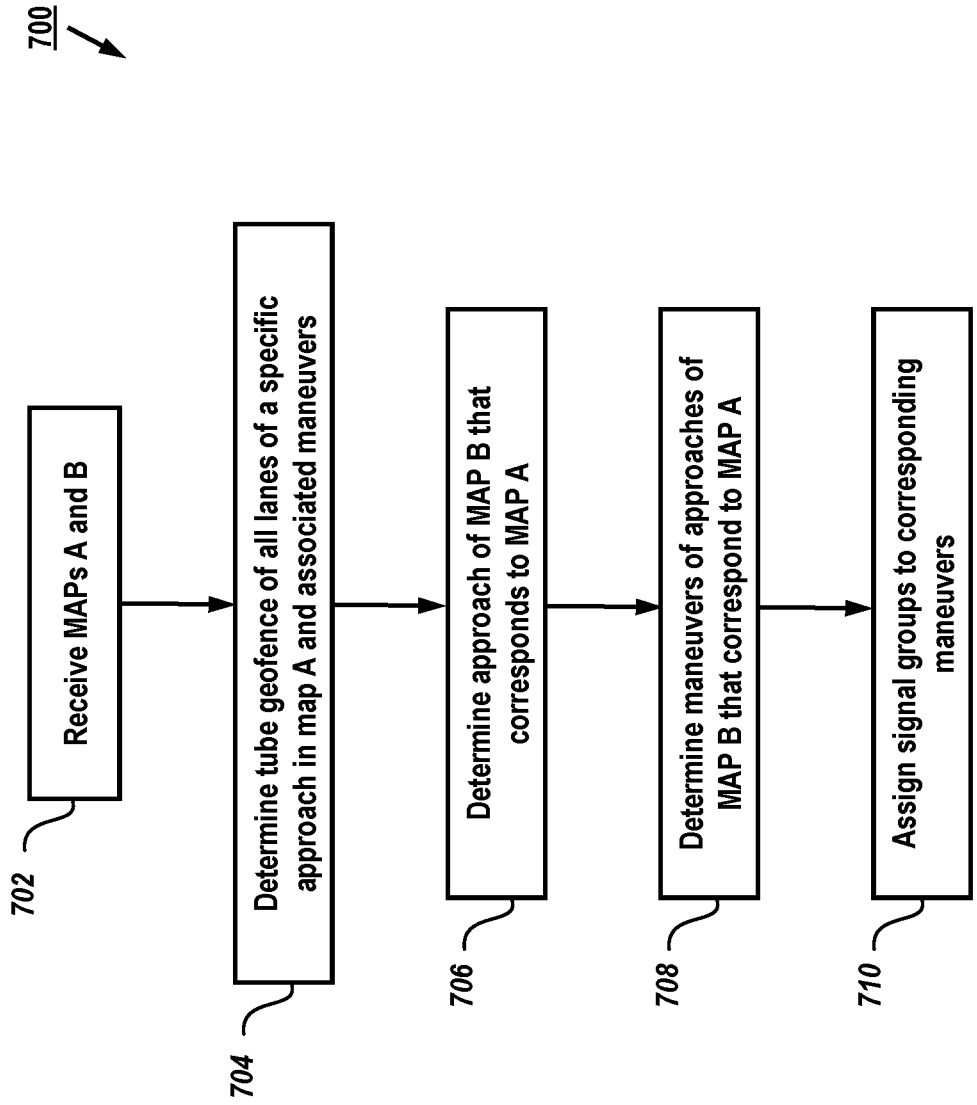
FIG. 7 shows a flow diagram for a map compare algorithm configured to merge two maps from different content providers using tube geofencing according to some aspects of the present disclosure.

FIG. 7 shows a flow diagram 700 for a MAP compare algorithm configured to merge two MAPs from different content providers using tube geofencing according to some aspects of the present disclosure. Similar to the example in FIG. 6, MAP data from two different sources (MAP A and MAP B) are received in block 702. In block 704, the MAP compare and select circuit (310) may determine a tube (trajectory line) geofence of all lanes of a specific approach in MAP A and associated maneuvers. A tube may be characterized by traffic that goes between one or two directions, between two or several points, wherein traffic may separated by separating the lines. The tube geofence may be thought of as a line with a safety margin (tolerance) of operation around it, forming a tube. In block 706 the MAP compare and select circuit (310) may determine the approaches of MAP B that correspond to the approaches of MAP A if all lanes are located within the tube geofence, wherein all points of the lanes are located within the determined tube. The heading of the lane points should show in the same direction, assuming a defined safety margin.

Points that are not located in the tube because of different lane lengths may be discarded, in some example.

In block 708, signal groups may be assigned by processing the lanes starting on one side (e.g., left/right) of the assigned approaches and determining the maneuvers of approaches of MAP B that correspond to MAP A. Different signal group IDs may then be assigned in block 710 to maneuvers that match the approach. The process may then continue by repeating the processes in blocks 706-710 for the next lane, and so on. In some examples, if the maneuver and number of lines do not match, no assignment is performed.

The SAE J2735 MAP allows for the geometric description of the stop bar. If a MAP with stop bar is provided. In this case another matching method is possible. The lanes that arrive (touch) at this stop bar can be grouped together into one approach. Each lane has an associated movement (maneuver). The stop bar of MAP A may also be used for MAP B if it is not available in MAP B. It is also possible to match stop bars between the two maps using the scoring algorithm described above. The approach, consisting of a group of lanes can be found in MAP A and MAP B. In order to find a corresponding lane the movement of same approach is compared between MAP A and MAP B. For example finding the left turn in MAP A in MAP B on the same stop bar (approach).

Figure 8:
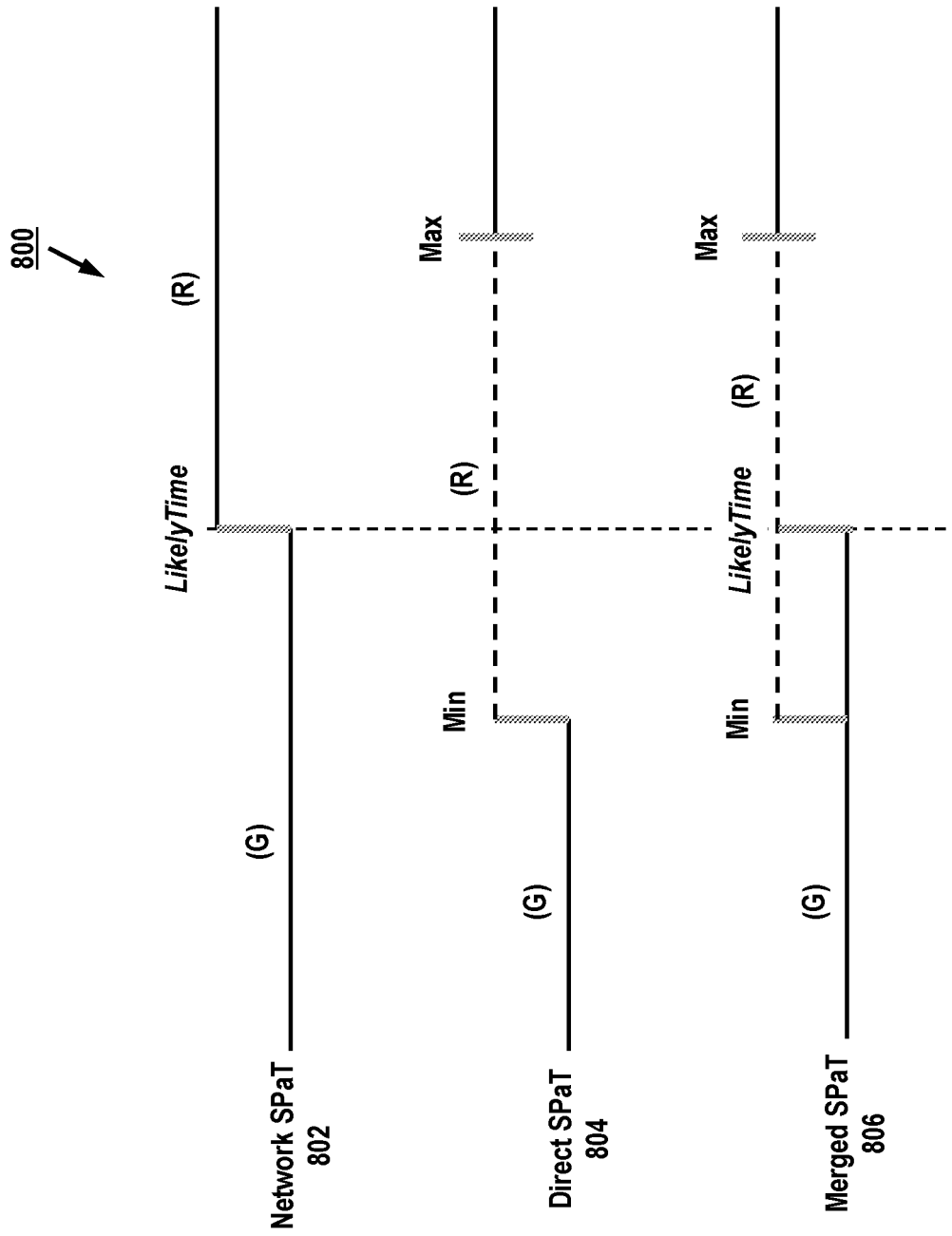
FIG. 8 shows a simulated timing diagram for merging network-based SPaT data and direct SPaT data where a LikelyTime traffic signal is determined between a minimum and maximum value according to some aspects of the present disclosure.

As discussed above, the MAP data including signal group mapping (314) may be provided to the SPaT merge circuit 312, which may allow the SPaT merge circuit to process traffic light data in order to estimate traffic light timings. FIG. 8 shows a simulated timing diagram 800 for merging (806) network-based SPaT data 802 and direct SPaT data 804 where a LikelyTime traffic signal is determined between a minimum (Min) and maximum value (Max) according to some aspects of the present disclosure. This example illustrates a configuration where a vehicle (e.g., 101) receives a network SPaT message 802 from a network source (e.g., 202) that includes a likelyTime field (see Table 1) indicating when a traffic light will turn from green (G) to red (R).

Approximately at the same time, the vehicle (e.g., 101) may receive a direct SPaT message 804 (e.g., via DSRC or C-V2X PC5 from RSU 210) indicating a Min time (e.g., minEndTime; see Table 1) and a Max time (e.g., minEndTime; see Table 1), but does not contain a likelyTime field. It may be assumed in this example that the SPaT received directly (804) has higher accuracy and has lower latency. During a SPaT merge (e.g., via 312), the two signals 802, 806 are processed to determine if the likelyTime occurs between the Min and a Max value as shown in the figure. Since the likelyTime occurs between the Min and Max value in the example, the SPaT merge circuit 312 merges the signals to produce a merged MSPaT message 806 that designates the likelyTime at the indicated time position between the Min and the Max values. The merged SPaT message 806 may then be transmitted (318) to a HMI (224) or other vehicle circuit to be processed for display/interaction for a user and/or to control a function of the vehicle.

Figure 9:
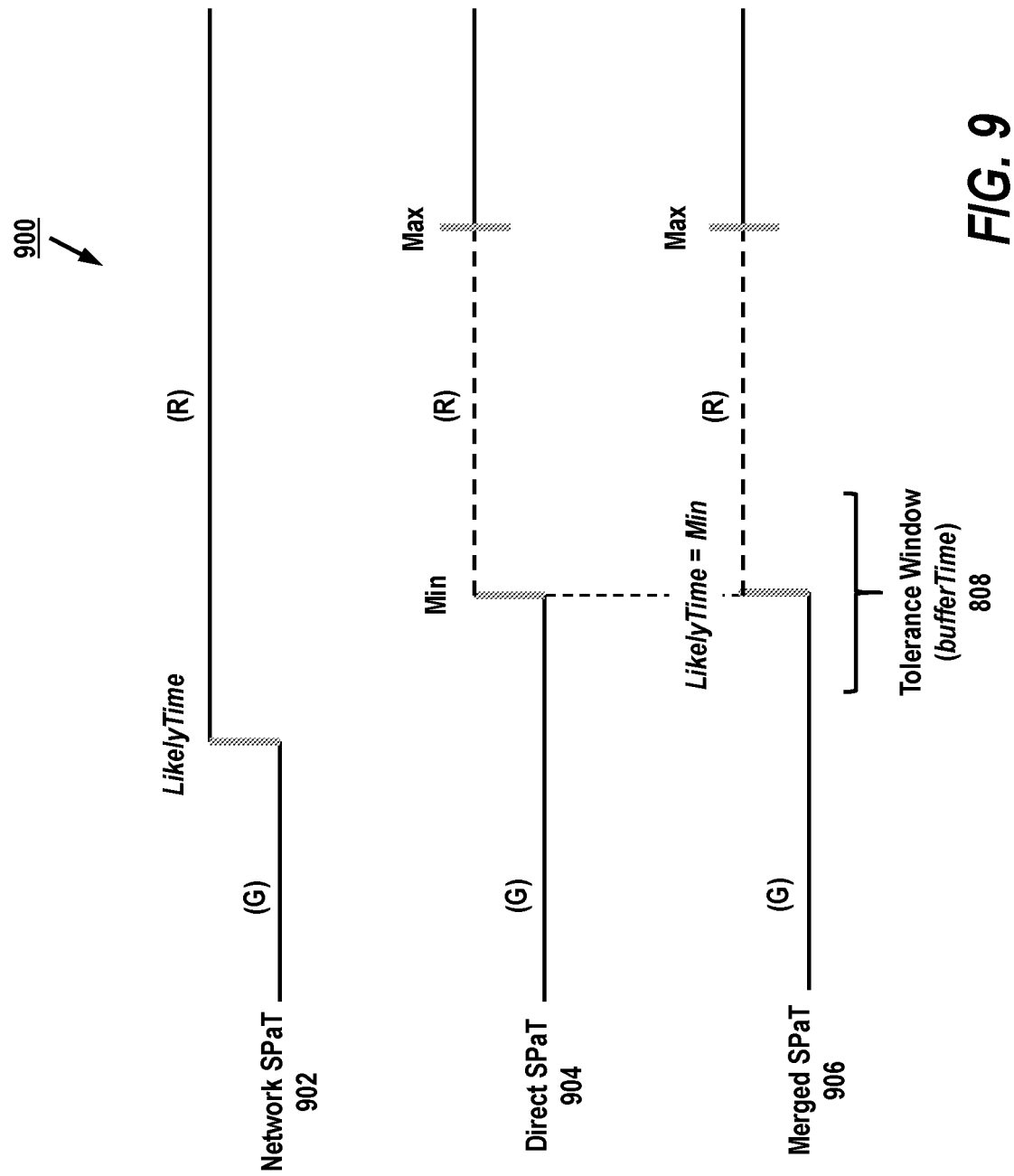
FIG. 9 shows a simulated timing diagram for merging network-based SPaT data and direct SPaT data where a LikelyTime traffic signal is determined before a minimum value according to some aspects of the present disclosure.

FIG. 9 shows a simulated timing diagram 900 for merging network-based SPaT data 902 and direct SPaT data 902 where a likelyTime traffic signal is determined before a minimum (Min) value according to some aspects of the present disclosure. The example of FIG. 9 is similar to the example of FIG. 8, except in this case, the likelyTime field in the timeline occurs before the Min and Max values included in the direct SPaT message 904. When generating the merged SPaT message 906, the SPaT merge circuit 312 sets the likelyTime field value to the Min value as shown in the figure. In some examples, the SPaT merge circuit 312 may also assign a tolerance window 808 of a configured length (e.g., a few seconds) as a time buffer for the likelyTime value. Accordingly, the likelyTime=minEndTime+bufferTime in the merged SPaT message, where the bufferTime may be used to extend the flexibility of the field value. In some examples, the likelyTime−minEndTime should be within the tolerance window (bufferTime) within a few seconds difference, or may otherwise be discarded.

Figure 10:
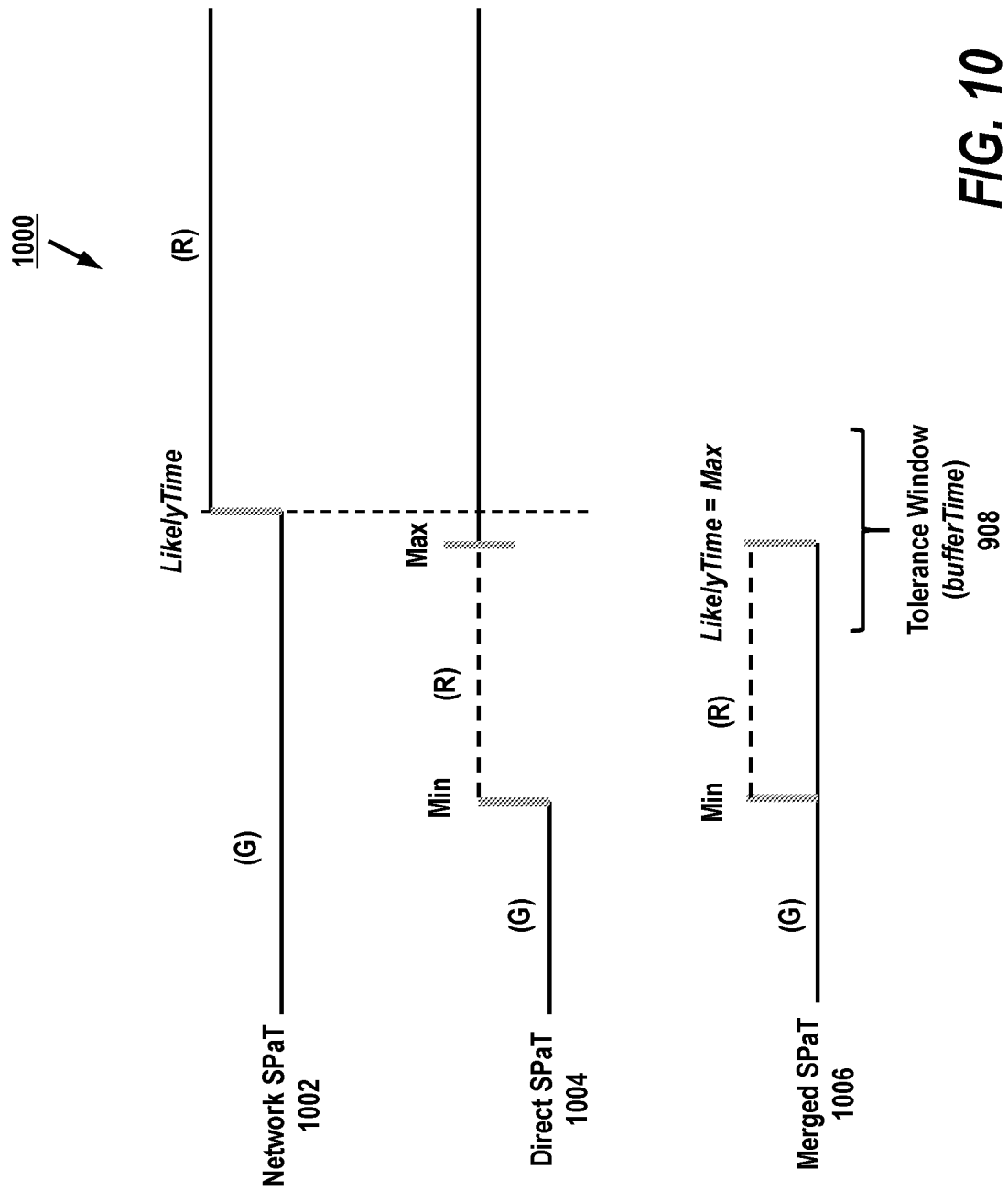
FIG. 10 shows a simulated timing diagram for merging network-based SPaT data and direct SPaT data where a LikelyTime traffic signal is determined after a maximum value according to some aspects of the present disclosure.

FIG. 10 shows a simulated timing diagram 1000 for merging network-based SPaT data 1002 and direct SPaT data 1004 where a likelyTime traffic signal is determined after a maximum (Max) value according to some aspects of the present disclosure. Again, example of FIG. 10 is similar to the example of FIG. 9, except here the likelyTime field of the network SPaT message 1002 is determined after the maximum (Max) value of the direct SPaT message 1004. In this case, when generating the merged SPaT message 1006, the SPaT merge circuit 312 sets the likelyTime field value to the Max value as shown in the figure. In some examples, the SPaT merge circuit 312 may also assign a tolerance window 908 of a configured length (e.g., a few seconds) as a time buffer for the likelyTime value. Accordingly, the likelyTime=maxEndTime+bufferTime in the merged SPaT message, where the bufferTime may be used to extend the flexibility of the field value. In some examples, the likelyTime−maxEndTime should be within the tolerance window (bufferTime) within a few seconds difference, or may otherwise be discarded.

Figure 11:
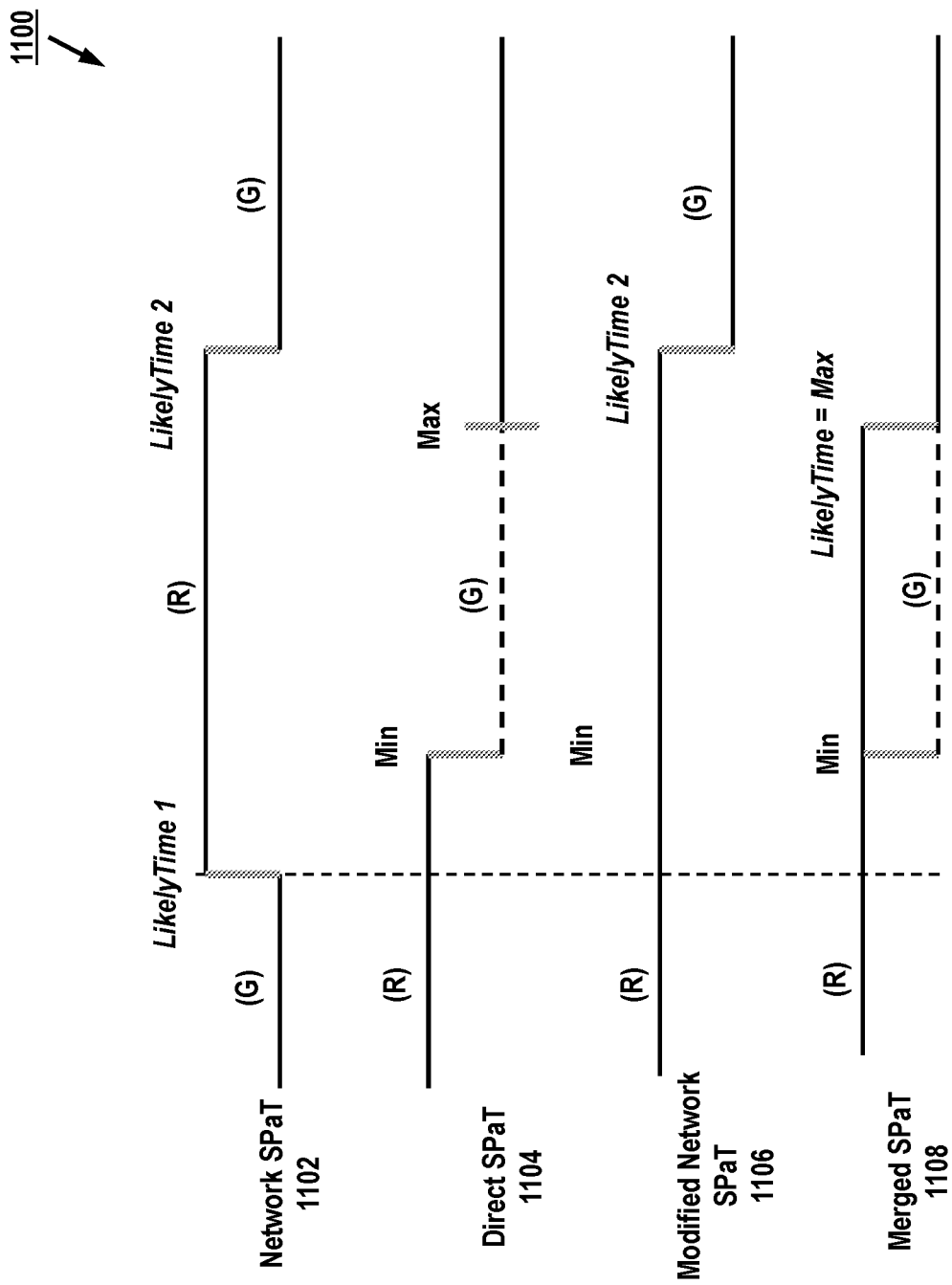
FIG. 11 shows a simulated timing diagram for merging network-based SPaT data and direct SPaT data where two LikelyTime traffic signals are determined between a minimum and maximum value according to some aspects of the present disclosure.

FIG. 11 shows a simulated timing diagram 1100 for merging network-based SPaT data 1102 and direct SPaT data 1104 where two likelyTime traffic signals (likelyTime 1, likelyTime 2) are determined between a minimum and maximum value according to some aspects of the present disclosure. FIG. 11 is similar to the example of FIG. 10, and additionally show a likelyTime 1 of network SPaT message 1102 indicating a traffic light phase change from green (G) to red (R) in the timeline, followed by a likelyTime 2 indicating another traffic light phase change from red (R) back to green (G) as is shown in the figure. In the direct SPaT message 1104, the Min value is after the likelyTime 1 value, and the Max value is before the likelyTime 2 value. As the likelyTime 1 period has already occurred, the SPaT merge circuit 312 generates a modified network SPaT message 1106 in which the likelyTime 1 field is deleted as shown in the figure, leaving only the likelyTime 2 phase transition from red (R) to green (G).

At this point, the process in FIG. 11 may be processed similarly to that described above in FIG. 10, and the SPaT merge circuit 312 generates a merged SPaT message 1108, where the likelyTime for message 1108 may be set to the Max value (likelyTime=Max), and the Min value is set relative to the traffic light phase transition from red (R) to green (G).

Figure 12:
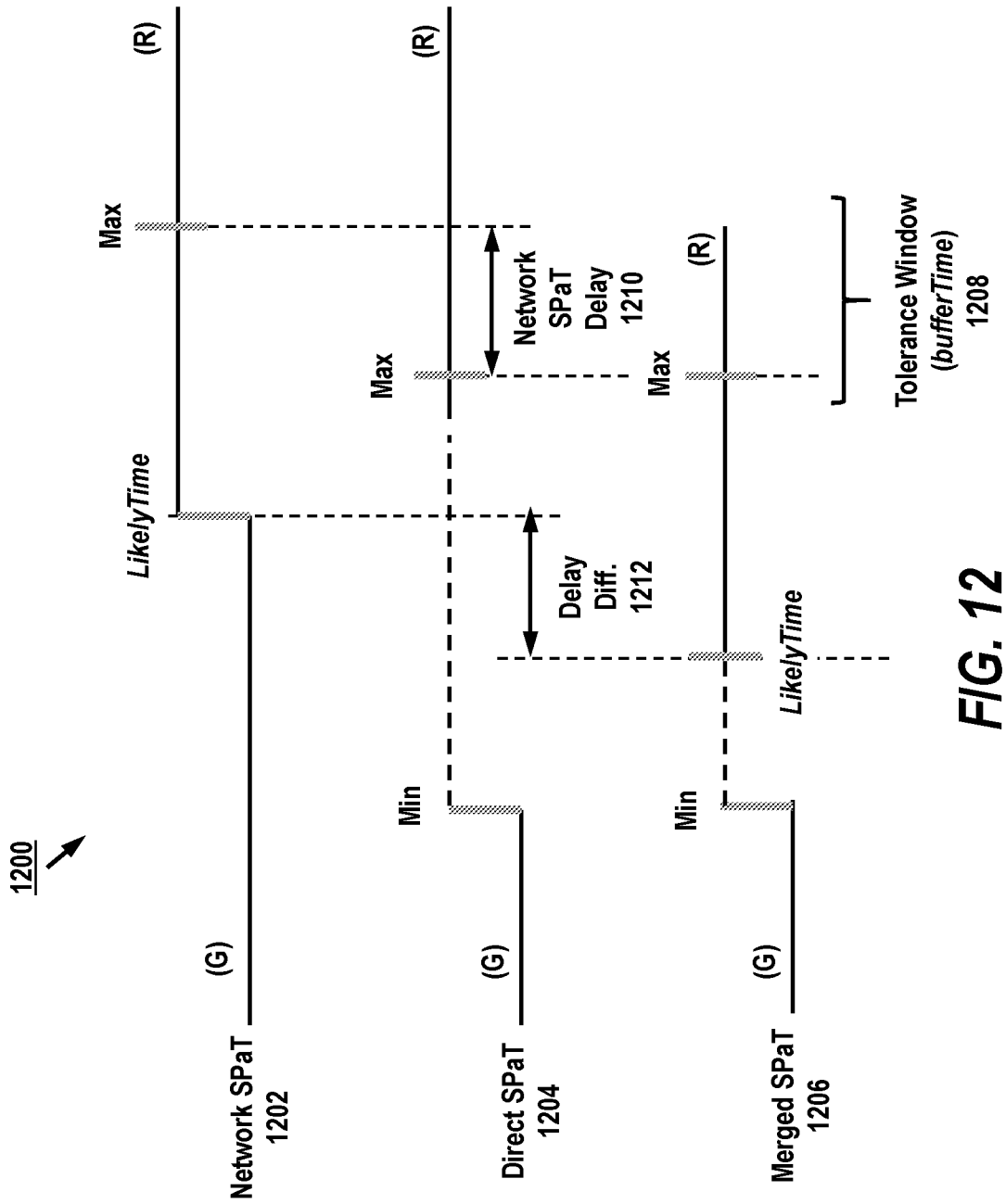
FIG. 12 shows an illustrative process for merging MAP data for a SPaT message in a vehicle, according to some aspects of the present disclosure.

FIG. 12 shows a simulated timing diagram 1200 for merging network-based SPaT data 1202 and direct SPaT data 1204 to determine an estimated traffic signal phase change based on received maximum values according to some aspects of the present disclosure. In this example, a network SPaT message 1202 is received that includes a likelyTime and Max field (e.g., maxEndTime), while the direct SPaT message 1204 includes only a Min and Max field (e.g., minEndTime, maxEndTime) relative to the traffic signal, as shown in the figure. As the Max field of direct SPaT message 1204 is likely to be received first, a network SPaT delay 1210 may be calculated between the Max field of direct SPaT message 1204 and Max field of network SPaT message 1202, where the delay=maxEndTime$_{networkSPaT}$−maxEndTime$_{directSPaT}$.

The calculated network SPaT delay 1210 may then be applied to the likelyTime value from network SPaT message 1202 to establish a delay difference 1212 for establish a likelyTime value for the merged SPaT message 1206, as shown in the figure. The Max value from the direct SPaT message 1204 may be merged to message 1206, where, in some examples, the SPaT merge circuit 312 may also assign a tolerance window 1208 of a configured length (e.g., a few seconds) as a time buffer for the Max value.

Figure 13:
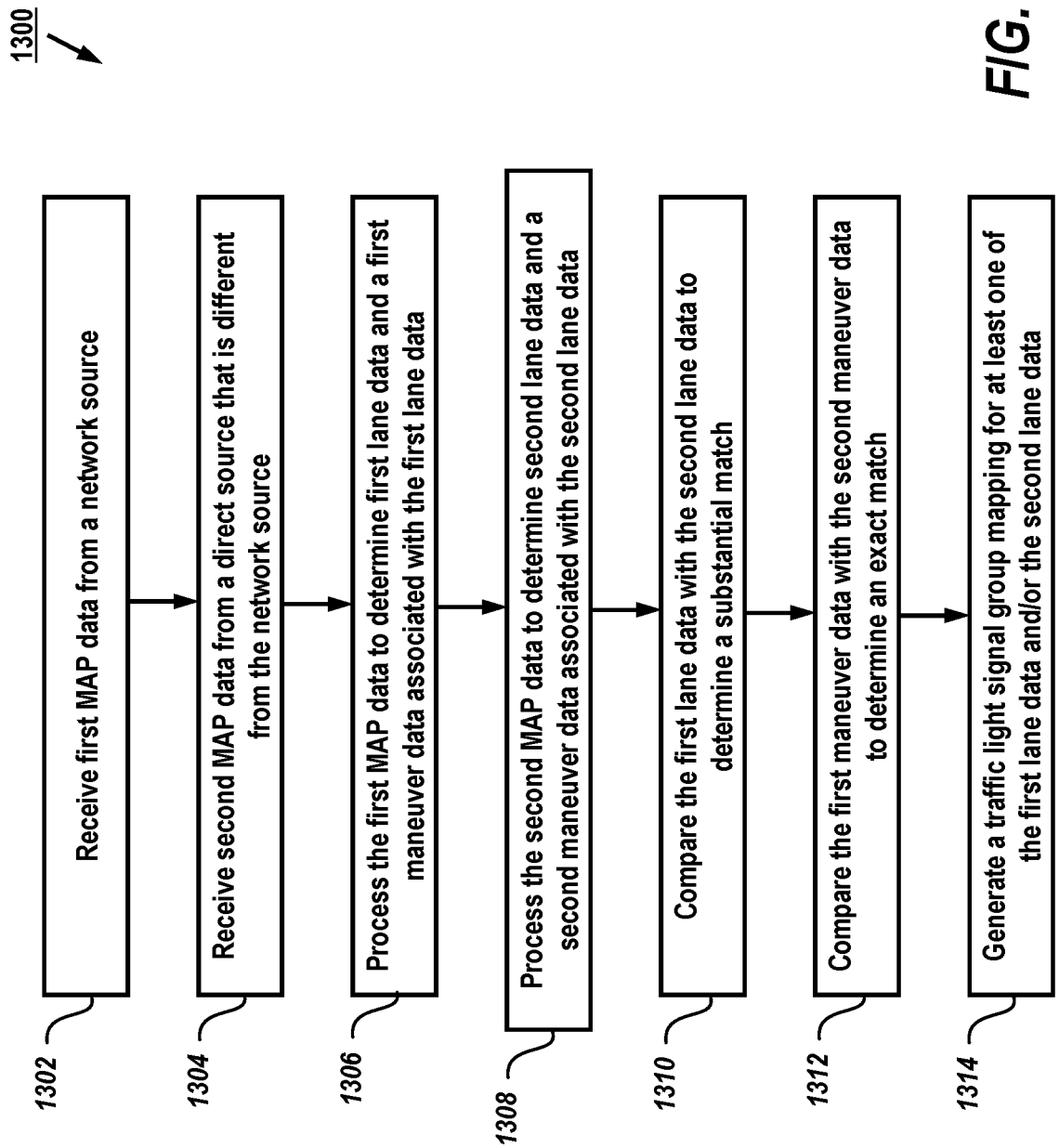
FIG. 13 shows an illustrative process for merging SPaT messages in a vehicle, according to some aspects of the present disclosure.

FIG. 13 shows an illustrative process 1300 for merging MAP data for a SPaT message in a vehicle, according to some aspects of the present disclosure. In block 1302, a vehicle may receive (e.g., via 216) first MAP data from a network source (e.g., 202), and receive second MAP data from a direct source (e.g., RSU 210) that is different from the network source in block 1304. In block 1306, MAP compare and select circuitry 310 may process the first MAP data to determine first lane data and a first maneuver data associated with the first lane data, and process the second MAP data to determine second lane data and a second maneuver data associated with the second lane data in block 1308, as discussed in greater detail above in connection with FIGS. 6-7. In block 1310, the MAP compare and select circuitry 310 may then compare the first lane data with the second lane data to determine a substantial match (e.g., distance score, location in tube geofence) and compare the first maneuver data with the second maneuver data (e.g., straight, left turn) to determine an exact match in block 1312. In block 1314, the MAP compare and select circuitry 310 may generate a traffic light signal group mapping for at least one of the first lane data and/or the second lane data (see FIGS. 6-7).

Figure 14:
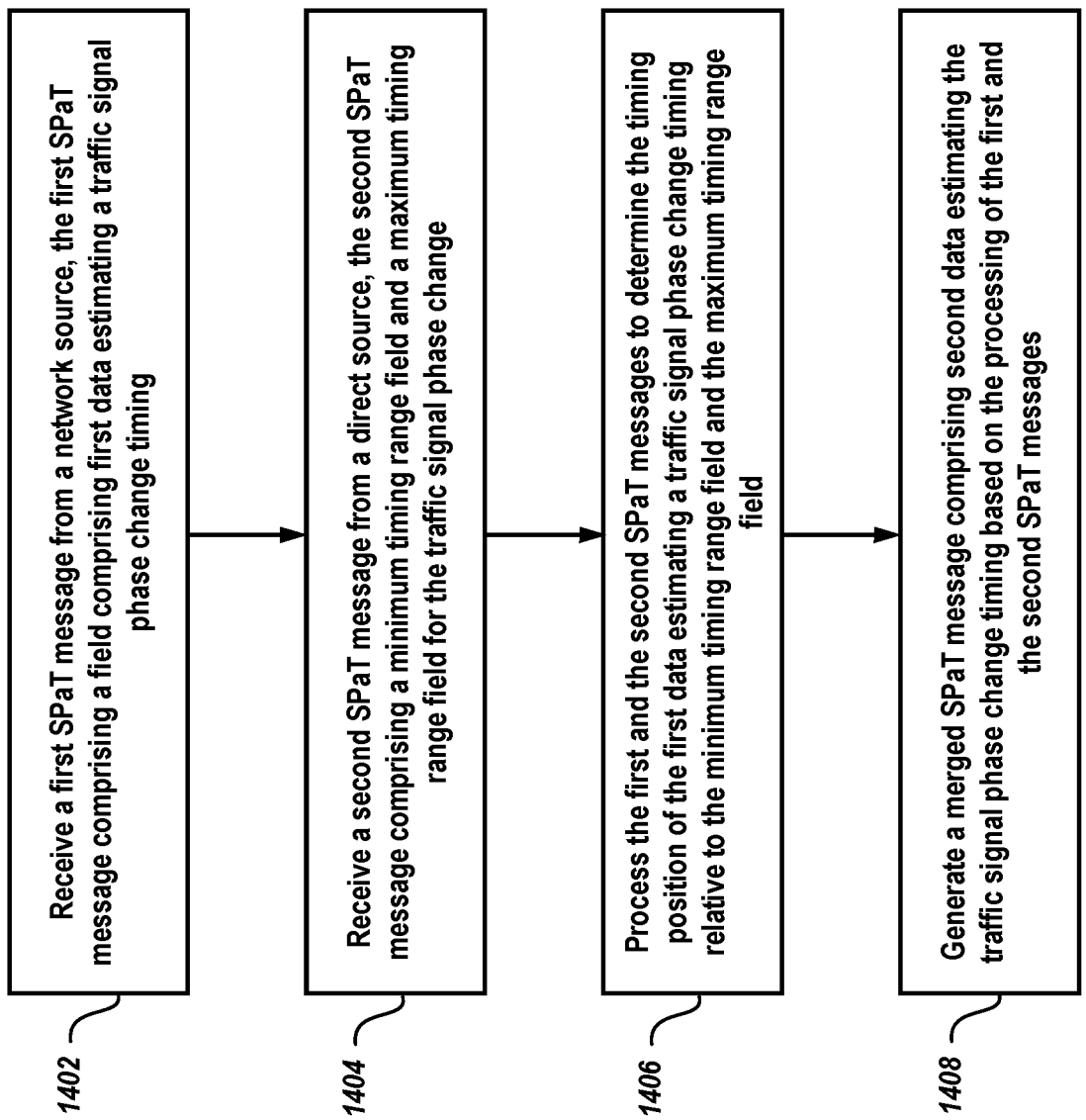
FIG. 14 shows another illustrative process for merging SPaT messages in a vehicle, according to some aspects of the present disclosure.

FIG. 14 shows an illustrative process 1400 for merging SPaT messages in a vehicle, according to some aspects of the present disclosure. In block 1402, the SPaT merge circuitry 312 may receive a first SPaT message from a network source (e.g., 202), the first SPaT message including a field (e.g., likelyTime) comprising first data estimating a traffic signal phase change timing. In block 1404, the SPaT merge circuitry 312 may receive a second SPaT message from a direct source (e.g., RSU 210), the second SPaT message comprising a minimum timing range field (Min) and a maximum timing range field (Max) for the traffic signal phase change. In block 1406, the SPaT merge circuitry 312 may process the first and the second SPaT messages (e.g., 802-804, 902-904, 1002-1004, 1102-1104) to determine the timing position of the first data estimating a traffic signal phase change timing (e.g., likelyTime) relative to the minimum timing range field (Min) and the maximum timing range field (Max). In block 1408, the SPaT merge circuit 312 may generate a merged SPaT message (e.g., 806, 906, 1006, 1108, 1206) comprising second data (likelyTime) estimating the traffic signal phase change timing based on the processing of the first and the second SPaT messages.

As described above, some or all illustrated features may be omitted in a particular implementation within the scope of the present disclosure, and some illustrated features may not be required for implementation of all examples. In some examples, the methods and processes described in FIGS. 6-14 may be performed by a vehicle (e.g., 101), as described above and/or by a processor/processing system or circuitry (e.g., 102-111, 214-224, 310, 312, 324) or by any suitable means for carrying out the described functions.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for traffic light management for a vehicle, comprising:
    receiving first MAP data from a network source;
    receiving second MAP data from a direct source;
    processing the first MAP data to determine first lane data and a first maneuver data associated with the first lane data;
    processing the second MAP data to determine second lane data and a second maneuver data associated with the second lane data;
    comparing the first lane data with the second lane data to determine a substantial match;
    comparing the first maneuver data with the second maneuver data to determine an exact match; and
    generating a traffic light signal group mapping for at least one of the first lane data and/or the second lane data.

2. The method of claim 1, wherein processing the first MAP data and second MAP data comprises segmenting the first lane data and the second lane data into a plurality of equally spaced sample points.

3. The method of claim 1, wherein processing the first MAP data and second MAP data comprises determining a respective distance between each of the sample points of the segmented first lane data and second lane data.

4. The method of claim 3, wherein the comparing of the first lane data with the second lane data to determine the substantial match comprises:
    summing the respective distance between each of the sample points of the segmented first lane data and second lane data to determine a distance score; and
    designating the distance score as the substantial match if the distance score meets a threshold.

5. The method of claim 1, wherein processing the first MAP data and second MAP data comprises:
    determining a tube geofence for the first lane data; and
    determining an approach direction for the first lane data.

6. The method of claim 5, wherein comparing the first lane data with the second lane data to determine a substantial match comprises:
    determining if an approach for the second lane data matches the approach for the first lane data; and
    determining if all of the points of the second lane data are contained within the tube geofence.

7. The method of claim 1, wherein
    receiving the first MAP data from the network source comprises receiving the first MAP data on a cellular network, and
    receiving the second MAP data from the direct source comprises receiving the second MAP data on a wireless broadcast communication platform.

8. The method of claim 7, wherein receiving the second MAP data from the direct source comprises receiving the second MAP data from a road-side unit (RSU).

9. The method of claim 1, further comprising generating a merged signal phase and timing (SPaT) message for traffic signal timing utilizing the generated traffic light signal group mapping.

10. The method of claim 9, wherein in the generating the merged signal phase and timing (SPaT) message step, further comprising:
receiving a first SPaT message from the network source, the first SPaT message comprising a field comprising first data estimating a traffic signal phase change timing;
receiving a second SPaT message from the direct source, the second SPaT message comprising a minimum timing range field and a maximum timing range field for the traffic signal phase change;
processing the first and the second SPaT messages to determine the timing position of the first data estimating a traffic signal phase change timing relative to the minimum timing range field and the maximum timing range field; and
generating the merged SPaT message comprising second data estimating the traffic signal phase change timing based on the processing of the first and the second SPaT messages.

11. The method of claim 10, wherein the second data estimating the traffic signal phase change timing is the same as the first data if the processing of the first and the second SPaT messages determines the timing position of the first data is between the minimum timing range field and the maximum timing range field.

12. The method of claim 10, wherein generating the merged SPaT message comprising the second data comprises configuring the second data to match the minimum timing range field if the processing of the first and the second SPaT messages determines the timing position of the first data is before the minimum timing range field and the maximum timing range field.

13. The method of claim 12, wherein generating the merged SPaT message comprises applying a tolerance window to the second data.

14. The method of claim 10, wherein generating the merged SPaT message comprising the second data comprises configuring the second data to match the maximum timing range field if the processing of the first and the second SPaT messages determines the timing position of the first data is after the maximum timing range field and the maximum timing range field.

15. The method of claim 14, wherein generating the merged SPaT message comprises applying a tolerance window to the second data.

16. The method of claim 15, wherein the tolerance window is configured to extend at least from the maximum timing range field to the first data estimating the traffic signal phase change timing.

17. The method of claim 10, wherein the first SPaT message further comprises another field comprising additional data estimating a second traffic signal phase change timing.

18. The method of claim 17, wherein processing the first and the second SPaT messages comprises determining the timing position of the first data and the additional data estimating the traffic signal phase change timing relative to the minimum timing range field and the maximum timing range field.

19. The method of claim 18, further comprising deleting the first data if (i) the timing position of the first data is determined to be before the minimum timing range and (ii) the additional data is determined to be after the maximum timing range field.

20. The method of claim 19, further comprising configuring the additional data to match the maximum timing range field.

21. The method of claim 10, wherein
receiving the first SPaT message from the network source comprises receiving the first SPaT message on a cellular network, and
receiving the second SPaT message from the direct source comprises receiving the second SPaT message on a wireless broadcast communication platform.

22. The method of claim 21, wherein receiving the second SPaT message from the direct source comprises receiving the second SPaT message from a road-side unit (RSU).

23. The method of claim 10, wherein processing the first and the second SPaT messages comprises determining a timing difference between the maximum timing range field of the second SPaT message and a maximum timing range field of the first SPaT message, and applying the timing difference to the second data estimating the traffic signal phase change timing.

* * * * *